(12) United States Patent
Kitada et al.

(10) Patent No.: US 9,531,956 B2
(45) Date of Patent: Dec. 27, 2016

(54) IMAGE DISPLAY APPARATUS THAT ADJUSTS PIXEL GRADATION VALUES USING A LOWER LIMIT VALUE AND CONTROL METHOD THEREOF

(71) Applicant: CANON KABUSHIKI KAISHA, Tokyo (JP)

(72) Inventors: Kazuya Kitada, Machida (JP); Osamu Yonishi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/745,695

(22) Filed: Jun. 22, 2015

(65) Prior Publication Data

US 2015/0373275 A1 Dec. 24, 2015

(30) Foreign Application Priority Data

Jun. 24, 2014 (JP) ................. 2014-129050

(51) Int. Cl.
| | |
|---|---|
| *H04N 5/222* | (2006.01) |
| *H04N 5/232* | (2006.01) |
| *H04N 9/04* | (2006.01) |
| *H04N 5/235* | (2006.01) |
| *G06T 5/00* | (2006.01) |
| *H04N 5/20* | (2006.01) |
| *H04N 9/68* | (2006.01) |

(52) U.S. Cl.
CPC ........... *H04N 5/23293* (2013.01); *G06T 5/007* (2013.01); *H04N 5/20* (2013.01); *H04N 5/2355* (2013.01); *H04N 9/04* (2013.01); *H04N 9/68* (2013.01)

(58) Field of Classification Search
CPC .................................................. H04N 5/23293
USPC .................................................... 348/333.12
See application file for complete search history.

(56) References Cited

U.S. PATENT DOCUMENTS

| | | | | |
|---|---|---|---|---|
| 2006/0153445 | A1* | 7/2006 | Lin ......................... | G06T 5/009 |
| | | | | 382/169 |
| 2007/0081740 | A1* | 4/2007 | Ciudad .............. | H04N 1/00286 |
| | | | | 382/276 |
| 2013/0223746 | A1* | 8/2013 | Yuan ....................... | G06T 5/007 |
| | | | | 382/195 |

FOREIGN PATENT DOCUMENTS

| | | |
|---|---|---|
| JP | 2000-244793 A | 9/2000 |
| JP | 2002-064740 A | 2/2002 |

* cited by examiner

*Primary Examiner* — Usman Khan
(74) *Attorney, Agent, or Firm* — Cowan, Liebowitz & Latman, P.C.

(57) ABSTRACT

An image display apparatus according to the present invention, includes: a first acquisition unit configured to acquire captured image data from an image capturing apparatus; a second acquisition unit configured to acquire operation information representing a user operation performed on the image capturing apparatus, from the image capturing apparatus; an image processing unit configured to generate processed image data by carrying out image processing corresponding to the operation information acquired by the second acquisition unit on the captured image data acquired by the first acquisition unit; and a display unit configured to display a processed image based on the processed image data on a screen.

19 Claims, 9 Drawing Sheets

IMAGE DISPLAY APPARATUS THAT ADJUSTS PIXEL GRADATION VALUES USING A LOWER LIMIT VALUE AND CONTROL METHOD THEREOF

BACKGROUND OF THE INVENTION

Field of the Invention

The present invention relates to an image display apparatus and a control method thereof.

Description of the Related Art

Remarkable advances made in the field of video cameras and other image capturing apparatuses in recent years have made it possible to generate high-quality captured image data having a wide dynamic range. In addition, specifications that define an even wider dynamic range have been proposed in the manner of SMPTE ST 2065-1:2012 (Academy Color Encoding Specification (ACES)). Log formats such as ACES Proxy have been proposed for use as formats of captured images having a wide dynamic range.

As a result of captured image data having a wider dynamic range, the amount of detailed information relating to dark portions of images can be increased in comparison with the prior art, enabling images to be richly expressed even when capturing dark scenes. Consequently, there is a growing need to confirm captured image data during image capturing. For example, there is a growing need to confirm the details of dark portions of images.

A person capturing an image performs a user-designated procedure such as adjusting exposure or sensitivity for the image capturing apparatus. If it is necessary to perform individual user-designated procedures for both the image capturing apparatus and the image di splay apparatus when confirming captured image data, user-friendliness of the system (image capturing system having an image capturing apparatus and an image display apparatus) ends up decreasing. Consequently, it is preferable to be able to remotely control the image display apparatus using the image capturing apparatus.

A known example of the prior art relating to remote control using an image capturing apparatus is disclosed in Japanese Patent Application Laid-open No. 2002-064740. According to the technology disclosed in Japanese Patent Application Laid-open No. 2002-064740, an image capturing apparatus outputs operation information representing a user operation performed on the image capturing apparatus, to an external apparatus.

Captured image data is, for example, transferred from an image capturing apparatus (display) to an image display apparatus via an SDI interface, and displayed and confirmed on the image display apparatus. At this time, the dynamic range of image data able to be displayed by the image display apparatus is frequently narrower than the dynamic range of the captured image data. Consequently, image processing was conventionally carried out on the captured image data by a user operation on the image capturing apparatus. For example, the dynamic range of the captured image data was reduced or the black level (gradation value corresponding to black color) of the captured image data was enhanced. The adjusted captured image data (processed image data) was then displayed on the image display apparatus and confirmed.

However, in the case of having performed a user operation for carrying out image processing on captured image data when confirming the captured image data in the prior art, the processed image data was recorded (stored) as an image capturing result. Since the dynamic range of processed image data is narrower than the original image data, it is not preferable as image data for storage. Consequently, in the prior art, it was necessary to repeat image capturing in order to generate captured image data prior to image processing corresponding to a user operation as image data for storage each time captured image data was confirmed, thereby resulting in extremely poor work efficiency.

SUMMARY OF THE INVENTION

The present invention provides a technology that makes it possible to inhibit decreases in user-friendliness when confirming captured image data as well as decreases in work efficiency attributable to confirmation of captured image data.

The present invention in its first aspect provides an image display apparatus, comprising:

a first acquisition unit configured to acquire captured image data, generated by an image capturing apparatus, from the image capturing apparatus;

a second acquisition unit configured to acquire operation information representing a user operation performed on the image capturing apparatus for carrying out image processing relating to gradation on the captured image data, from the image capturing apparatus;

an image processing unit configured to generate processed image data by carrying out image processing corresponding to the operation information acquired by the second acquisition unit on the captured image data acquired by the first acquisition unit; and a display unit configured to display a processed image based on the processed image data on a screen.

The present invention in its second aspect provides a method for controlling an image di splay apparatus, comprising:

a first acquisition step of acquiring captured image data, generated by an image capturing apparatus, from the image capturing apparatus;

a second acquisition step of acquiring operation information representing a user operation performed on the image capturing apparatus for carrying out image processing relating to gradation on the captured image data, from the image capturing apparatus;

an image processing step of generating processed image data by carrying out image processing corresponding to the operation information acquired in the second acquisition step on the captured image data acquired in the first acquisition step; and a display step of displaying a processed image based on the processed image data on a screen.

The present invention in its third aspect provides a non-transitory computer readable medium that stores a program, wherein the program causes a computer to execute the method.

According to the present invention, decreases in user-friendliness when confirming captured image data as well as decreases in work efficiency attributable to confirmation of captured image data can be inhibited.

Further features of the present invention will become apparent from the following description of exemplary embodiments with reference to the attached drawings.

DESCRIPTION OF THE EMBODIMENTS

The following provides an explanation of the image display apparatus and control method thereof according to examples of the present invention. However, the following examples are merely intended to be exemplary, and the present invention is not limited to the following examples.

EXAMPLE 1

Figure 1:
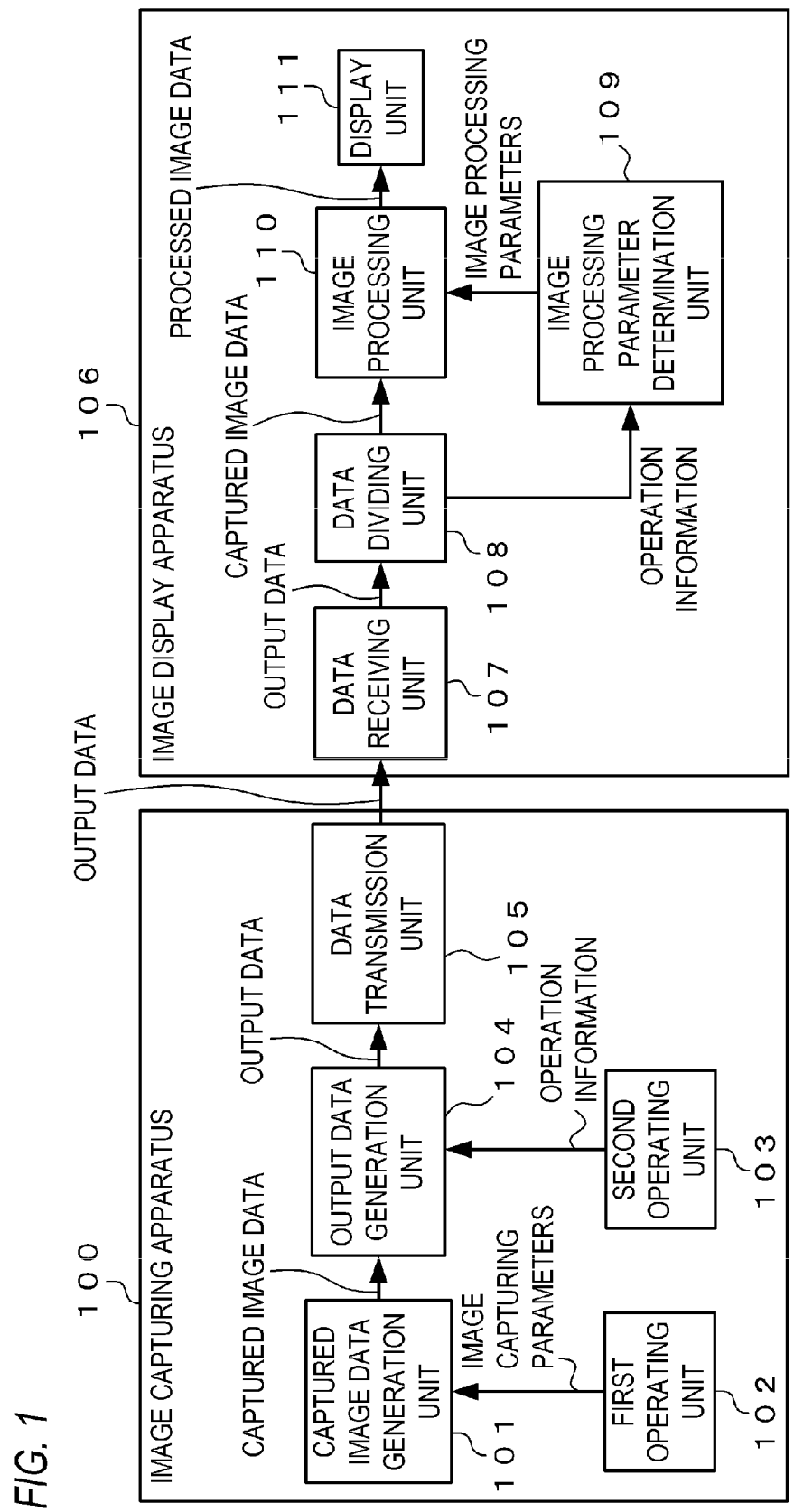
FIG. 1 is a block diagram showing one example of the functional configuration of an image capturing system according to Example 1.

FIG. 1 is a block diagram showing one example of the functional configuration of an image capturing system according to Example 1 of the present invention. As shown in FIG. 1, the image capturing system according to the present example has an image capturing apparatus 100 and an image display apparatus 106. The image capturing apparatus 100 and the image display apparatus 106 can be connected to an external apparatus. In the example of FIG. 1, the image capturing apparatus 100 and the image display apparatus 106 are interconnected.

The image capturing apparatus 100 is an apparatus that generates captured image data corresponding to image capturing using the image capturing apparatus 100. The image capturing apparatus 100 records captured image data in a storage apparatus or outputs captured image data to an external apparatus. The storage apparatus that stores captured image data may be an apparatus possessed by the image capturing apparatus 100 (internal apparatus), or may be an apparatus separate from the image capturing apparatus 100 (external apparatus).

As shown in FIG. 1, the image capturing apparatus 100 has, for example, a captured image data generation unit 101, a first operating unit 102, a second operating unit 103, an output data generation unit 104 and a data transmission unit 105.

The captured image data generation unit 101 generates captured image data corresponding to image capturing using the image capturing apparatus 100. The captured image data generation unit 101 has, for example, an image sensor and an AD conversion unit. A CMOS sensor, for example, can be used for the image sensor. The image sensor converts light received during image capturing to an electrical signal (analog data). The AD conversion unit converts analog data generated with the image sensor to digital data in the form of captured image data.

The first operating unit 102 is an operating unit (such as a button or dial) operated by a user to adjust image capturing parameters. Examples of image capturing parameters include ISO sensitivity, frame rate, shutter speed and white balance.

In the captured image data generation unit 101, captured image data is generated corresponding to image capturing parameters set using the first operating unit 102.

The second operating unit 103 is an operating unit that differs from the first operating unit 102. The second operating unit 103 is an operating unit (such as a button or dial) operated by a user to carry out image processing on captured image data. In the image capturing apparatus 100, image processing or alteration of image capturing parameters is not carried out corresponding to a user operation using the second operating unit 103. In the present example, adjustment (setting) of lower limit values of gradation values of image data following image processing is carried out by a user using the second operating unit 103.

An ancillary data region, where other data in the manner of transmission specifications defined in SMPTE291M can be superimposed as ancillary data, is present in the data region of captured image data. The ancillary data region is a blanking region in which gradation values (pixel values), for example, are not present.

The output data generation unit 104 superimposes operation information representing a user operation performed using the second operating unit on captured image data as ancillary data. Output data is generated as a result thereof. In the present example, lower limit information representing the lower limit values of gradation values of image data following image processing is superimposed as operation information. Consequently, data including captured image data (gradation values of captured image data) and lower limit information is generated as output data.

The data transmission unit 105 outputs output data generated in the output data generation unit 104 outside the image capturing apparatus 100. In the present example, output data is output to the image display apparatus 106 via an SDI interface.

Furthermore, there are no particular limitations on the method used to output data. For example, captured image data and operation information may be output separately. A first output processing, which outputs captured image data to the image display apparatus 106, and a second output processing, which outputs operation information to the image display apparatus 106, may be executed by mutually different functional units. In addition, data may also be output using a communication interface that differs from an SDI interface.

The image display apparatus 106 is an apparatus that displays image data input to the image display apparatus 106 on a screen. The image display apparatus 106 carries out image processing on image data as necessary when displaying image data on a screen.

As shown in FIG. 1, the image display apparatus 106 has, for example, a data receiving unit 107, a data dividing unit 108, an image processing parameter determination unit 109, an image processing unit 110 and a display unit 111.

The data receiving unit 107 acquires data from outside the image display apparatus 106. In the present example, the data receiving unit 107 acquires output data from the image capturing apparatus 100 via an SDI interface. The data receiving unit 107 then outputs the output data to the data dividing unit 108.

Furthermore, there are no particular limitations on the method used to acquire data. For example, captured image data and operation information may be acquired separately. A first acquisition processing, which acquires captured image data from the image capturing apparatus 100, and a second acquisition processing, which acquires operation information from the image capturing apparatus 100, may be carried out by mutually different functional units. In addition, data may be acquired using a communication interface that differs from an SDI interface.

The data dividing unit 108 divides output data acquired by the data receiving unit 107 between captured image data and operation information (lower limit information). The data dividing unit 108 outputs captured image data to the image processing unit 110 and outputs lower limit information to the image processing parameter determination unit 109.

Furthermore, the data dividing unit 108 is not required in the case captured image data and operation information are acquired separately.

The image processing parameter determination unit 109 determines image processing parameters used in image processing by the image processing unit 110 based on operation information output from the data dividing unit 108. In the present example, the image processing parameter determination unit 109 determines an offset value added to gradation values based on lower limit information in the form of image processing parameters. More specifically, the black level shift value, which is a value of the lower limit information, is converted to an offset value, which is a lower limit value represented by the lower limit information. The image processing parameter determination unit 109 then outputs the image processing parameter in the form of this offset value to the image processing unit 110.

In the case the units of the black level shift value are the same as the units of the lower limit value, a value equal to the black level shift value is determined as the offset value. In the case the units of the black level shift value differ from the units of the lower limit value, the black level shift value is converted to the offset value using, for example, information representing the correspondence relationship between the black level shift value and the offset value (such as a function or table).

Furthermore, although an explanation is provided in the present example using the example of determining an offset value added to a gradation value, this is not limited thereto. For example, a gain value that is multiplied by a gradation value may be determined for each gradation value based on a lower limit value represented by the lower limit information.

The image processing unit 110 generates image data used for confirmation but not for storage in the form of processed image data by carrying out image processing on captured image data acquired by the data receiving unit 107 corresponding to operation information acquired by the data receiving unit 107. In the present example, the image processing unit 110 generates processed image data by carrying out image processing on captured image data output from the data dividing unit 108 using image processing parameters output from the image processing parameter determination unit 109. More specifically, processed image data is generated by converting a gradation value of each pixel of captured image data so that the lower limit value of the gradation values of the processed image data coincides with the lower limit value represented by the lower limit information (first image processing). Even more specifically, processed image data is generated by adding an offset value determined by the image processing parameter determination unit 109 to the gradation value of each pixel of captured image data. Consequently, processed image data is generated such that the degree of black floating increases the larger the offset value. The image processing unit 110 then outputs the processed image data to the display unit 111.

The display unit 111 displays processed images based on processed image data output from the image processing unit 110 on a screen. A user is able to confirm the processed image data by viewing the screen of the image display apparatus 106.

Figure 2:
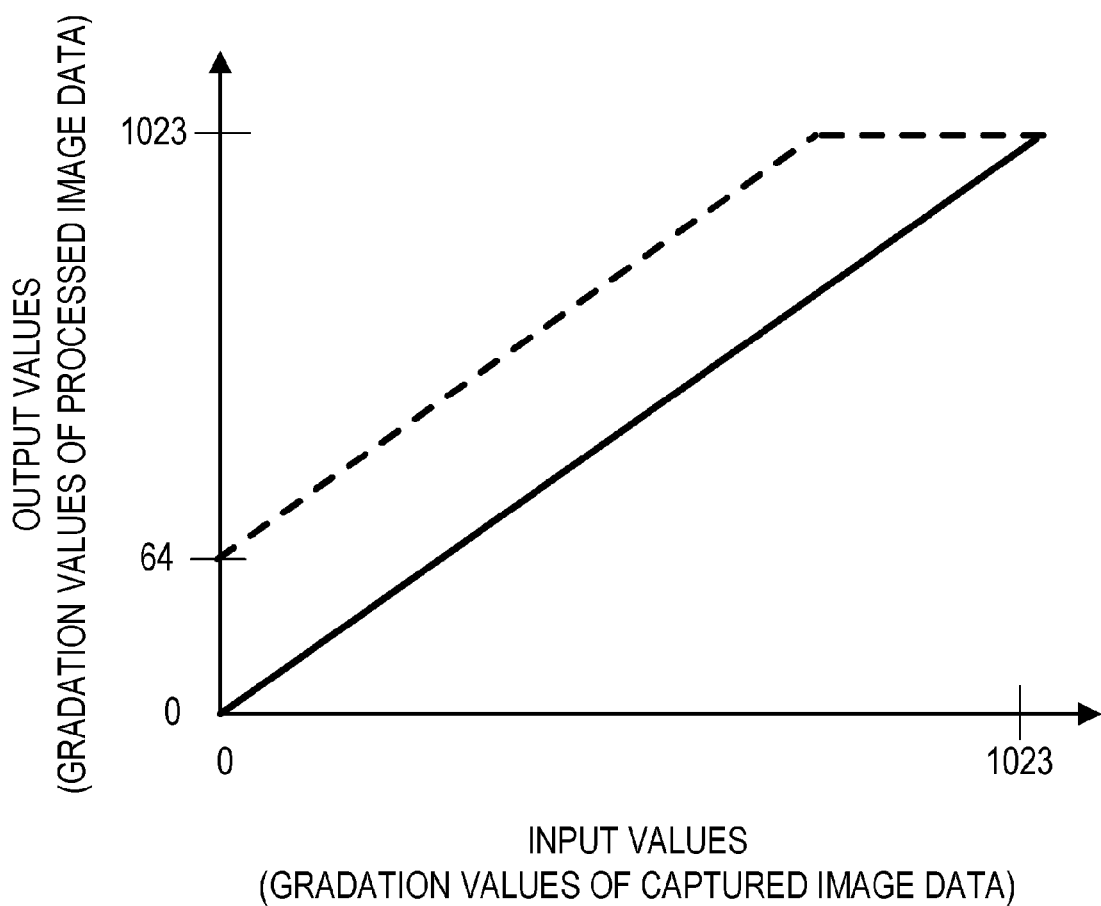
FIG. 2 is a graph showing one example of the correspondence relationship between captured image data and processed image data according to Example 1.

FIG. 2 is a graph showing one example of the correspondence relationship between gradation values of captured image data and gradation values of processed image data. In FIG. 2, the solid line indicates the correspondence relationship in the case the offset value is 0, while the broken line indicates the correspondence relationship in the case the offset value is 64. FIG. 2 shows an example of the case in which the gradation values of captured image data and processed image data are both 10-bit values (0 to 1023).

In the case 0 has been set for the lower limit value of the gradation values of processed image data by a user operation on the second operating unit 103, captured image data and lower limit information, in which 0 is represented as the lower limit value, are output from the image capturing apparatus 100 to the image display apparatus 106. In the image display apparatus 106, 0 is determined for the offset value and processed image data is displayed on the screen in which the degree of black floating has been held to a minimum. More specifically, as indicated by the solid line in FIG. 2, the same value as the gradation value of captured image data is acquired for the gradation value of processed image data. Processed image data that is the same as the captured image data is then displayed on the screen.

In the case 64 has been set for the lower limit value of the gradation values of processed image data by a user operation on the second operating unit 103, captured image data and lower limit information, in which 64 is represented as the lower limit value, are output from the image capturing apparatus 100 to the image display apparatus 106. In the image display apparatus 106, 64 is determined for the offset value and processed image data is displayed on the screen in which the degree of black floating has been enhanced. More specifically, as indicated by the broken line in FIG. 2, a value of 64 is added to the gradation values of captured image data as the gradation values of processed image data. Processed image data, in which the degree of black floating is higher than in the case of the offset value being 0, is then displayed on the screen. As a result, a user is able to easily confirm the details of dark portions of captured image data.

In the case the lower limit value of the gradation values of processed image data has been changed by a user operation on the second operating unit 103, the image display apparatus 106 acquires output data from the image capturing apparatus 100 that at least includes lower limit information representing the changed lower limit value. The image display apparatus 106 then re-determines the offset value based on the acquired lower limit information, and updates processed image data by carrying out image processing using the re-determined offset value. As a result of repeatedly changing the lower limit value of the gradation values of processed image data by a user operation on the second operating unit 103, a user can confirm a plurality of processed image data sets having mutually different degrees of black floating.

Furthermore, as indicated by the broken line in FIG. 2, in the case the value resulting from adding the offset value to a gradation value of captured image data exceeds 1023 (upper limit value of 10-bit gradation values), 1023 is preferably acquired for the gradation value of the processed image data. Namely, the upper limit value of gradation values following addition of an offset value is preferably limited to 1023.

Furthermore, the number of bits (bit width) of gradation values of captured image data and processed image data may be greater than or less than 10 bits. In addition, the number of bits of captured image data may differ from the number of bits of processed image data. The number of bits of captured image data may be greater than or less than that of processed image data.

Furthermore, in the case the number of bits of at least one of captured image data and offset value differs from the number of bits of processed image data, the number of bits of captured image data and offset value is preferably made to be equal to the number of bits of processed image data. Offset addition processing, in which an offset value is added to a gradation value of captured image data, is preferably carried out after changing the number of bits. As a result, image processing can be carried out with high precision.

Figure 3:
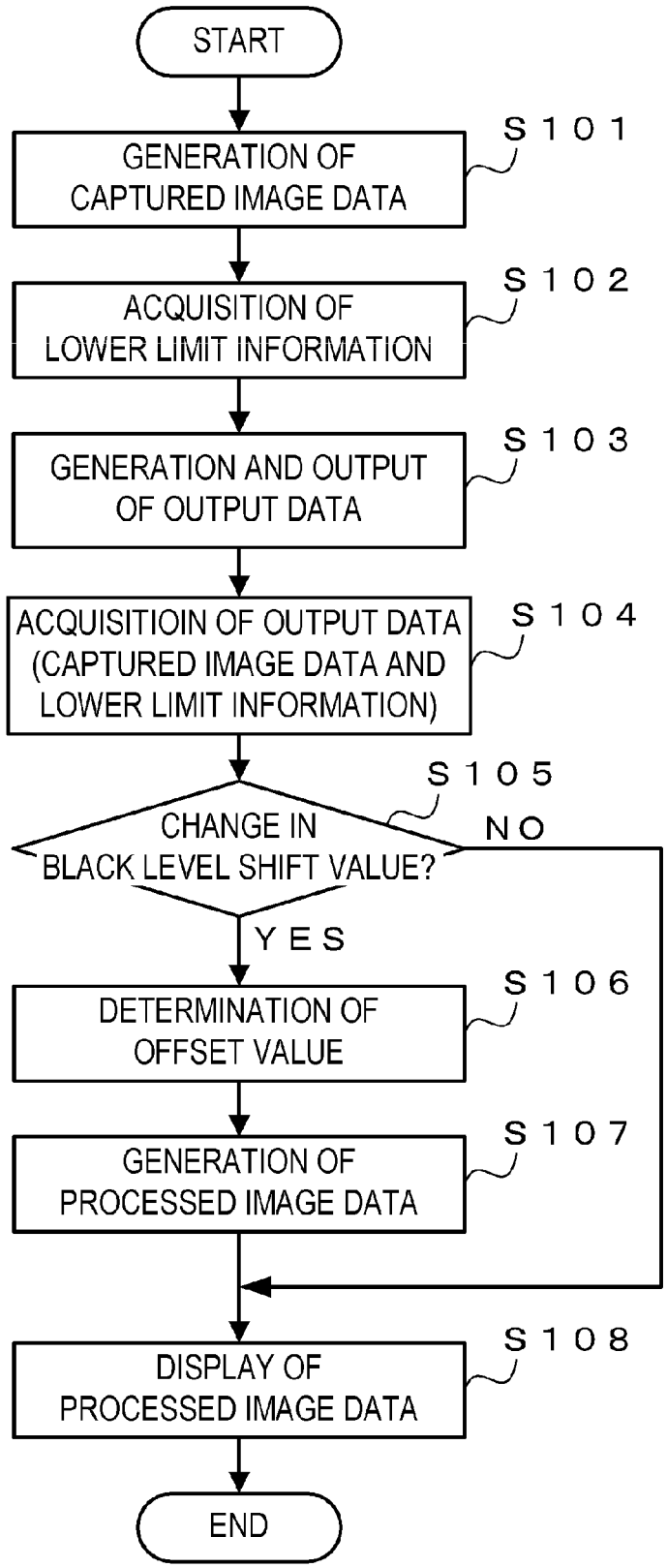
FIG. 3 is a flow chart showing an example of the processing flow of an image capturing system according to Example 1.

The following provides an explanation of processing flow of the image capturing system according to the present example using FIG. 3. FIG. 3 is a flow chart showing one example of the processing flow of the image capturing system according to the present example.

First, the captured image data generation unit 101 generates captured image data corresponding to image capturing parameters set using the first operating unit 102 (S101). The captured image data generation unit 101 outputs captured image data to the output data generation unit 104.

Next, the output data generation unit 104 acquires lower limit information corresponding to a user operation on the second operating unit 102 from the second operating unit 102 (S102). The second operating unit 102 has, for example, a dial for setting the black level shift value, or a button that switches offset addition processing on or off.

The output data generation unit 104 then generates output data by superimposing lower limit information acquired in S102 on an ancillary data region of captured image data generated in S101 (S103). The output data generation unit 104 outputs output data to the data transmission unit 105, and the data transmission unit 105 outputs the output data to the image display apparatus 106 via an SDI interface.

Next, the data receiving unit 107 receives output data output from the image capturing apparatus 100 in S103 (S104). The data receiving unit 107 outputs the output data to the data dividing unit 108. The data dividing unit 108 divides output data between the captured image data and the lower limit information, and outputs the captured image data to the image processing unit 110 and outputs the lower limit information to the image processing parameter determination unit 109.

The image processing parameter determination unit 109 then determines whether or not the black level shift value has changed based on the lower limit information acquired in S104 (S105). In the case the black level shift value has changed, processing proceeds to S106, while in the case the black level shift value has not changed, processing proceeds to S108.

In S106, the image processing parameter determination unit 109 determines an offset value based on lower limit information acquired in S104.

The image processing unit 110 then generates processed image data by adding the offset value determined in S106 to the gradation value of each pixel of the captured image data acquired in S104 (S107). The image processing unit 110 outputs the processed image data to the display unit 111.

In S108, the display unit 111 displays the processed image data generated in S107 on a screen.

As has been described above, the image display apparatus according to the present example acquires captured image data and operation information, representing a user operation for carrying out image processing on the captured image data, from the image capturing apparatus. The image display apparatus then generates processed image data by carrying out image processing corresponding to the operation information on the captured image data, and displays the processed image data on a screen. As a result, a user is able to confirm the captured image data as is (processed image data that is the same as captured image data) or confirm captured image data for which the degree of black floating has been enhanced (processed image data for which the degree of black floating is higher than that of the captured image data). Since the processed image data is image data used for confirmation but not for storage, a decrease in work efficiency attributable to confirmation of captured image data can be inhibited. More specifically, captured image data can be recorded in a storage apparatus without carrying out any image processing. As a result, the bother of having to repeat image capturing in order to generate captured image data for storage after having confirmed the captured image data (captured image data on which image processing has not been carried out) can be eliminated.

In addition, in the present example, a user operation for carrying out image processing on captured image data is carried out on the image capturing apparatus. As a result, decreases in user-friendliness during confirmation of captured image data can also be inhibited. More specifically, a user is able to confirm captured image data by only operating the image capturing apparatus instead of having to operate both the image capturing apparatus and the image display apparatus separately.

Furthermore, in the present example, although an explanation has been provided using as an example the case of first image processing that converts the gradation value of each pixel so that the lower limit value of the gradation values of processed image data coincides with the lower limit value represented by lower limit information, this not limited thereto. For example, image processing corresponding to operation information may also be image processing that emphasizes the edges of image data to a degree corresponding to operation information, image processing that blurs image data to a degree corresponding to operation information, or image processing that converts colors of image data corresponding to operation information. Image processing corresponding to operation information may also include a plurality of types of image processing.

Furthermore, although a detailed explanation thereof has been omitted in the present example, there are no particular limitations on the method used to record captured image data (image data on which image processing corresponding to a user operation using the second operating unit has not been carried out). For example, the image capturing apparatus may record captured image data in a storage unit possessed by the image capturing apparatus, or captured image data may be recorded in a storage apparatus connected to the image capturing apparatus (external apparatus). In addition, the image display apparatus may record captured image data in a storage unit possessed by the image display apparatus, or captured image data may be recorded in a storage apparatus connected to the image display apparatus (external apparatus).

EXAMPLE 2

There are image capturing apparatuses capable of generating and outputting captured image data having a wide dynamic range by using a log format.

Figure 4:
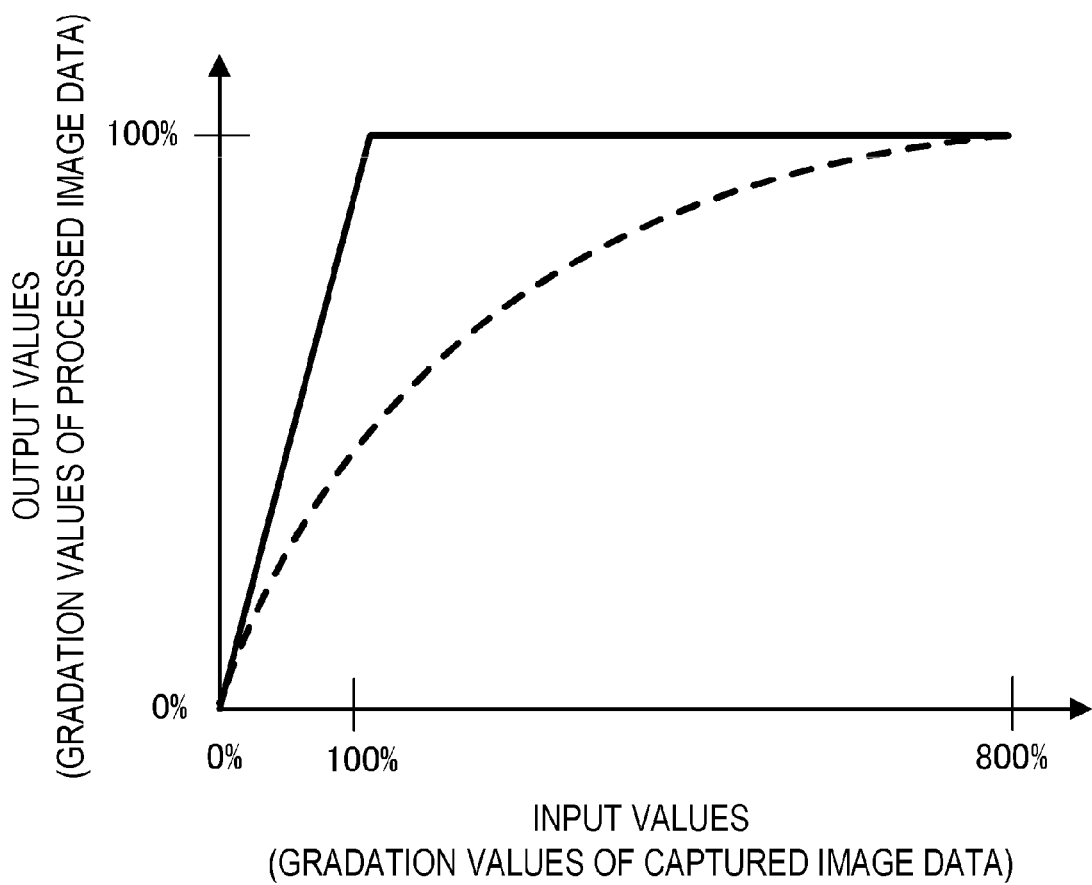
FIG. 4 is a graph showing one example of the dynamic range of image data according to Example 2.

FIG. 4 shows examples of the dynamic range of captured image data and the dynamic range of processed image data. In the example of FIG. 4, the captured image data has a wide dynamic range (0% to 800%), while the processed image data has a narrow dynamic range (0% to 100%). The captured image data may be image data of a log format, for example, while the processed image data may be image data of the Rec709 format.

Furthermore, gradation values of the processed image data shown in FIG. 4 are gradation values that are obtained by carrying out only range conversion processing without carrying out image processing other than range conversion processing (such as the first image processing (offset addition processing) described in Example 1). Range conversion processing is image processing in which the dynamic range of captured image data is converted to the dynamic range of processed image data.

As indicated by the solid line in FIG. 4, in the case the dynamic range of captured image data is 0% to 800% and the dynamic range of processed image data is 0% to 100%, processed image data ends up being obtained in which the gradation (resolution) of bright portions is low. More specifically, processed image data is obtained in which the gradation of bright portions is low as a result of gradation values of captured image data that exceed 100% being limited to 100%.

Consequently, the gradation value of each pixel of captured image data is typically converted using characteristics information (function or table) representing conversion characteristics between gradation values prior to range conversion processing and gradation values after range conversion processing. As a result, as indicated by the broken line in FIG. 4, processed image data can be obtained in which decreases in the gradation of bright portions have been inhibited. Characteristics information can also be referred to as "information representing the correspondence relationship between gradation values prior to range conversion processing and gradation values after range conversion processing."

However, the dynamic range of captured image data is not limited to a fixed value. For example, the dynamic range of captured image data may be changed corresponding to a user operation on the image capturing apparatus. Consequently, the dynamic range of captured image data input to the image display apparatus can change. In addition, there are cases in which a user may desire to make a detailed confirmation of a portion of the dynamic range of captured image data, and a user is able to change the gradation range that is desired to be confirmed (desired gradation range).

Consequently, preferable processed image data cannot be obtained by constantly using the same characteristics information.

Therefore, in Example 2, an explanation is provided of an example of the case of performing a user operation that changes (sets) a desired gradation range as a user operation for carrying out image processing on captured image data. In the present example, an explanation is provided of an example in which a second image processing (range conversion processing) is carried out in which the gradation value of each pixel is converted based on conversion characteristics corresponding to a desired gradation range when generating processed image data.

Furthermore, the following provides a detailed explanation of those aspects (configuration and processing) of the present example which differ from those of Example 1, while explanations of those aspects that are the same as Example 1 are omitted.

Furthermore, although an explanation of an example in which processed image data is generated by carrying out both offset addition processing and range conversion processing is provided in the present example, this is not limited thereto. For example, processed image data may also be generated by carrying out only range conversion processing.

Figure 5:
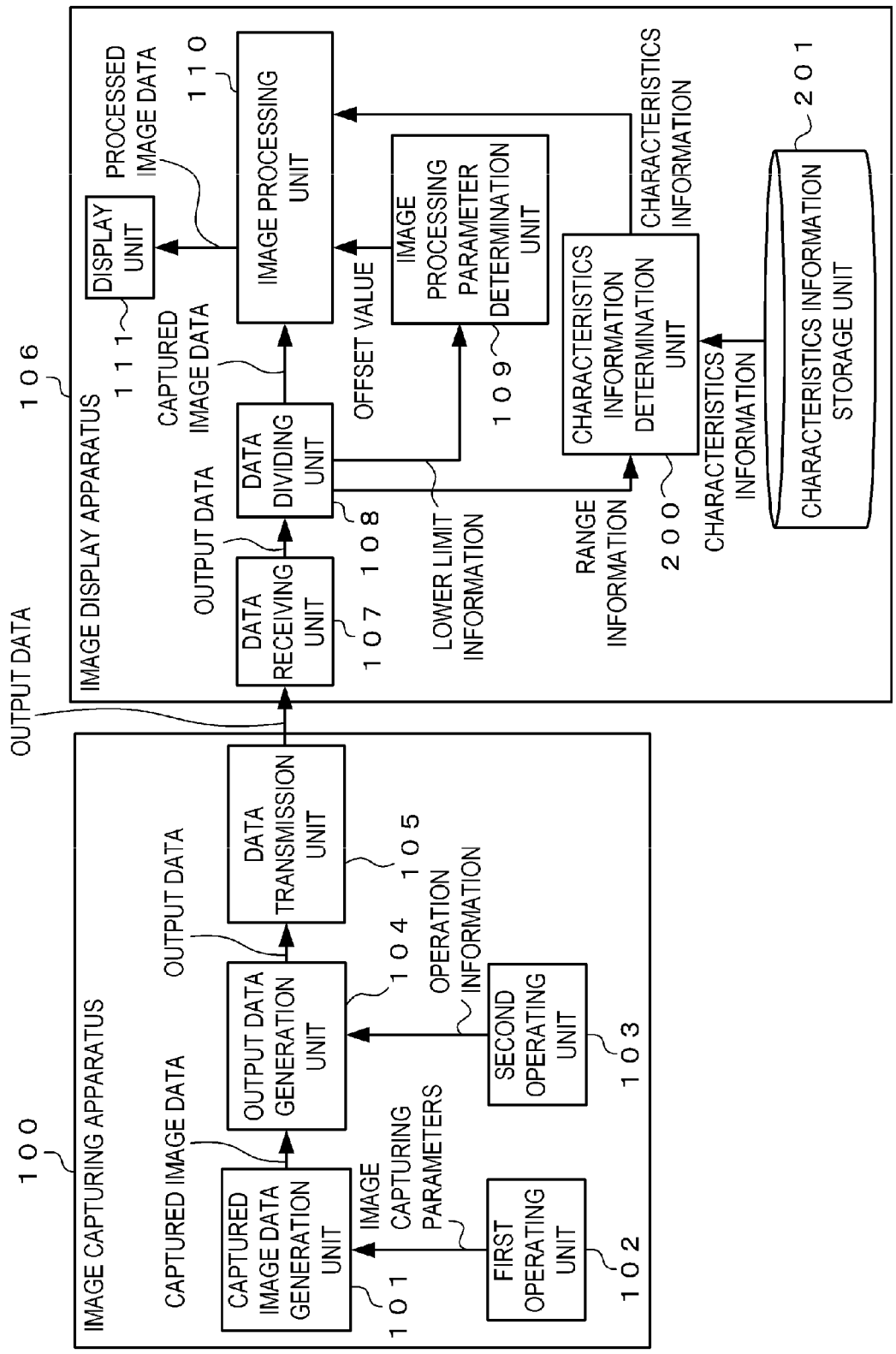
FIG. 5 is a block diagram showing an example of the functional configuration of an image capturing system according to Example 2.

FIG. 5 is a block diagram showing one example of the functional configuration of an image capturing system according to the present example. As shown in FIG. 5, in the present example, the image display apparatus 106 further has a characteristics information determination unit 200 and a characteristics information storage unit 201.

In the present example, a user operation for adjusting the lower limit value of gradation values of image data after image processing and a user operation for adjusting the desired gradation range are carried out using the second operating unit 103. The desired gradation range is all or a portion of the dynamic range of captured image data.

In the output data generation unit 104, lower limit information and range information representing the desired gradation range are superimposed on captured image data as ancillary data. Output data is generated as a result thereof.

The data dividing unit 108 divides the captured image data, lower limit information and range information. The data dividing unit 108 then outputs the captured image data to the image processing unit 110, outputs the lower limit information to the image processing parameter determination unit 109, and outputs the range information to the characteristics information determination unit 200.

The characteristics information storage unit 201 stores characteristics information representing conversion characteristics for each of a plurality of gradation ranges. A plurality of characteristics information corresponding to the plurality of gradation ranges is preliminarily recorded in the characteristics information storage unit 201. For example, a plurality of characteristics information is recorded in the characteristics information storage unit 201 during manufacturing of the image display apparatus 106.

The characteristics information determination unit 200 determines conversion characteristics corresponding to the desired gradation range represented by the range information, and outputs characteristics information representing the determined conversion characteristics to the image processing unit 110. More specifically, the characteristics information determination unit 200 selects characteristics information corresponding to the desired gradation range from among a plurality of characteristics information stored by the characteristics information storage unit 201. The characteristics information determination unit 200 then outputs the selected characteristics information to the image processing unit 110.

Furthermore, there are no particular limitations on the method used to acquire characteristics information representing conversion characteristics corresponding to the desired gradation range, and a method other than the method described above can be employed. For example, characteristics information representing conversion characteristics corresponding to the desired gradation range may be acquired from outside the image display apparatus 106. The image display apparatus 106 may have a generation unit that generates characteristics information representing conversion characteristics corresponding to the desired gradation range.

In the present example, pixel values of image data consist of RGB values (consisting of a combination of R values, which are the gradation values of red components, G values, which are the gradation values of green components, and B values, which are the gradation values of blue components). In the present example, information representing a desired gradation range common to the R value, G value and B value is used as range information, and a one-dimensional lookup table common to the R value, G value and B value is selected for use as characteristics information.

Furthermore, R value gradation characteristics (correspondence relationship between gradation value and brightness), G value gradation characteristics and B value gradation characteristics may be mutually different. In that case, information independently representing the desired gradation range of the R value, the desired gradation range of the G value and the desired gradation range of the B value is used as range information. A one-dimensional lookup table for R values, a one-dimensional lookup table for G values and a one-dimensional lookup table for B values are then selected for use as characteristics information. A three-dimensional lookup table (table in which RGB values prior to range conversion processing and RGB values after range conversion processing are mutually correlated) may also be selected.

Furthermore, pixel values are not limited to RGB. For example, pixel values may also consist of a combination of brightness values in the form of Y values, color difference values in the form of Cb values, and color difference values in the form of Cr values.

The image processing unit 110 generates processed image data by carrying out offset addition processing, in which an offset value is added to the gradation value of each pixel, and range conversion processing, in which the gradation value of each pixel is converted based on conversion characteristics corresponding to the gradation range represented by range information, on captured image data. In the present example, image processing that converts the gradation value of each pixel based on conversion characteristics represented by characteristics information selected with the characteristics information determination unit 200 is carried out as range conversion processing.

Furthermore, there are no particular limitations on the order in which offset addition processing and range conversion processing are carried out. Offset addition processing may be carried out on captured image data and range conversion processing may be carried out on image data following offset addition processing, or range conversion processing may be carried out on captured image data and offset addition processing may be carried out on image data following range conversion processing. A single image processing that realizes both offset addition processing and range conversion processing may also be carried out on captured image data.

Figure 6:
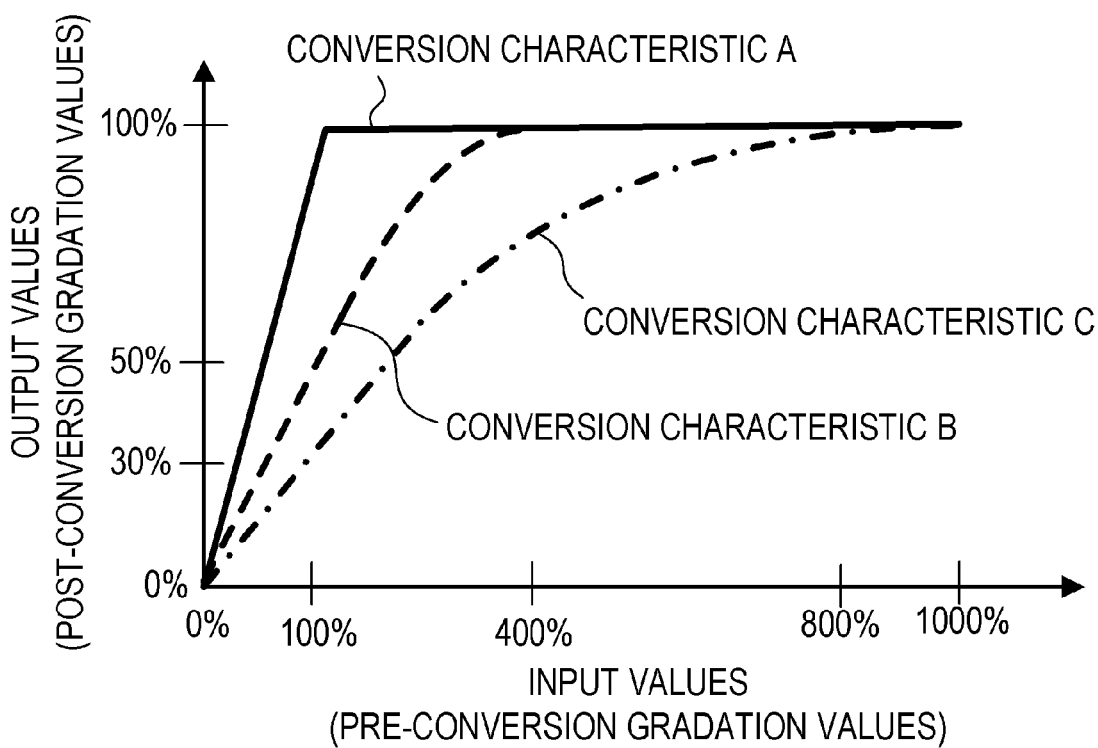
FIG. 6 is a graph showing one example of conversion characteristics according to Example 2.

In the present example, three one-dimensional lookup tables (characteristics information) respectively representing three conversion characteristics A to C are prepared in advance as shown in FIG. 6. Hereinafter, a gradation range prior to range conversion processing will be referred to as a "pre-conversion gradation range", a gradation range after range conversion processing will be referred to as a "post-conversion gradation range", a gradation value prior to range conversion processing will be referred to as a "pre-conversion gradation value", and a gradation value after range conversion processing will be referred to as a "post-conversion gradation value".

In the case of conversion characteristic A (solid line), post-conversion gradation values increase linearly from 0% to 100% with respect to an increase in pre-conversion gradation values over a pre-conversion gradation range of 0% to 100%. Consequently, in the case a pre-conversion gradation value is a gradation value of 0% to 100%, a value equal to the pre-conversion gradation value is obtained for the post-conversion gradation value. In the case of conversion characteristic A, a post-conversion gradation value of 100% is assigned to a pre-conversion gradation range that exceeds 100%. Consequently, in the case of using conversion characteristic A, pre-conversion gradation values greater than 100% are converted to a post-conversion gradation value of 100%.

In the case of conversion characteristic B (broken line), post-conversion gradation values increase logarithmically from 0% to 100% with respect to an increase in pre-conversion gradation values over a pre-conversion gradation range of 0% to 400%. In the case of conversion characteristic B, a post-conversion gradation value of 100% is assigned to a pre-conversion gradation range that exceeds 400%.

In the case of conversion characteristic C (single-dot broken line), post-conversion gradation values increase logarithmically from 0% to 100% with respect to an increase in pre-conversion gradation values over a pre-conversion gradation range of 0% to 1000%.

A dynamic range of captured image data can be preferably converted by suitably switching between these conversion characteristics.

In the present example, conversion characteristics are selected and used for which the number of post-conversion gradation values assigned to a desired gradation range is larger than other conversion characteristics. As a result, a dynamic range of captured image data can be preferably converted.

More specifically, conversion characteristic A is selected and used in the case a desired gradation range is within the gradation range of 0% to 100%. As a result, the dynamic range of captured image data can be converted without reducing the desired gradation range. If conversion characteristic B or C is used, the pre-conversion gradation range of 0% to 100% is reduced to a post-conversion gradation range of 0% to 50% or 0% to 30%, and gradation (resolution) of the desired gradation range ends up decreasing. Consequently, conversion characteristic A is preferably used in the case the desired gradation range is within a gradation range of 0% to 100%.

Conversion characteristic B is selected and used in the case the desired gradation range is within the range of 0% to 300%. In the case of using conversion characteristic B, a pre-conversion gradation range of 0% to 300% becomes narrower than the upper limit range of 0% to 100% of the post-conversion gradation range, and the post-conversion gradation range ends up being reduced. However, since the degree of reduction of the gradation range is low, processed image data can be generated that enables detailed confirmation of captured image data within a desired gradation range. In the case of using conversion characteristic A, although the pre-conversion gradation range of 0% to 300% is converted to a post-conversion gradation range of 0% to 100%, pre-conversion gradation values greater than 100% end up being converted to a post-conversion gradation value of 100%. In the case of using conversion characteristic C, the pre-conversion gradation range of 0% to 300% ends up being reduced to an extremely narrow post-conversion gradation range. Consequently, if conversion characteristic A or C is used, processed image data cannot be generated that enables detailed confirmation of captured image data within a desired gradation range.

Furthermore, the number of the plurality of characteristic information prepared in advance may be larger or smaller than 3.

Furthermore, there are no particular limitations on the method used to select conversion information (conversion characteristics). For example, it is only required to generate processed image data that enables detailed confirmation of captured image data over a desired gradation range. In addition, instead of selecting and using one of a plurality of preliminarily prepared conversion information, more preferable conversion information may be generated by interpolation processing using two or more conversion information, and the generated conversion information may then be used. For example, in the case a desired gradation range is within a gradation range of 0% to 300%, conversion characteristics may be generated in which post-conversion gradation values increase logarithmically from 0% to 100% with respect to an increase in pre-conversion gradation values over a pre-conversion gradation range of 0% to 300% using conversion characteristics A and B.

In the case a desired gradation range has been changed by a user operation on the second operating unit 103, the image display apparatus 106 acquires output data, which at least includes range information representing a desired gradation range after conversion, from the image capturing apparatus 100. The image display apparatus 106 then re-determines (re-selects) conversion characteristics based on the acquired range information and updates processed image data by executing range conversion processing (and offset addition processing) using the re-determined conversion characteristics. A user is then able to confirm the details of captured image data over various gradation ranges by repeatedly updating the desired gradation range by performing a user operation on the second operating unit 103.

As has been previously described, according to the present example, decreases in work efficiency attributable to confirmation of captured image data as well as decreases in user-friendliness during confirmation of captured image data can be inhibited in the same manner as Example 1.

In addition, in the present example, range conversion processing is carried out that uses conversion characteristics corresponding to a desired gradation range when generating processed image data. As a result, processed image data can be generated that enables detailed confirmation of captured image data over a desired gradation range.

EXAMPLE 3

Explanations were provided in Examples 1 and 2 of examples of displaying processed image data (processed images based on processed image data) on a screen.

Here, it is preferable that image processing carried out on captured image data by a user operation be easily understood by the user.

Therefore, in Example 3, an explanation is provided of an example of displaying a combined image in which is arranged a captured image based on captured image data and a processed image based on processed image data.

As a result of displaying the above-mentioned combined image, a user is able to easily understand what image processing was carried out on captured image data by a user operation by visually comparing the captured image and processed image. User-friendliness can be improved as a result thereof.

Furthermore, the following provides a detailed explanation of those aspects (configuration and processing) of the present example which differ from those of Example 1, while explanations of those aspects that are the same as Example 1 are omitted.

Figure 7:
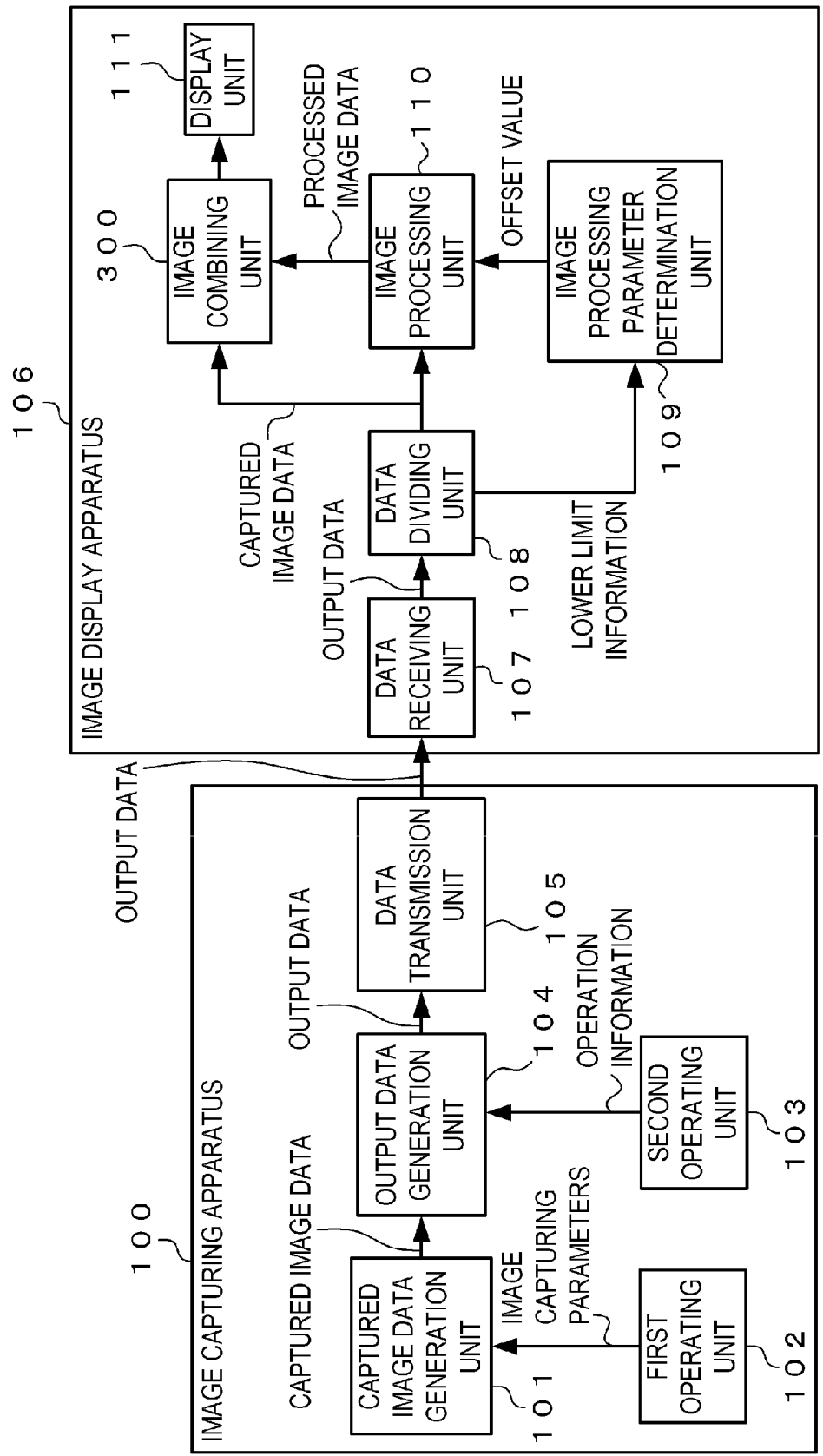
FIG. 7 is a block diagram showing one example of the functional configuration of an image capturing system according to Example 3.

FIG. 7 is a block diagram showing one example of the functional configuration of an image capturing system according to the present example. As shown in FIG. 7, in the present example, the image display apparatus 106 further has an image combining unit 300.

The data dividing unit 108 divides output data to captured image data and lower limit information. The data dividing unit 108 then outputs the captured image data to the image processing unit 110 and the image combining unit 300, and outputs lower limit information to the image processing parameter determination unit 109.

The image combining unit 300 generates combined image data, representing a combined image in which a captured image and a processed image are arranged, based on captured image data output from the data dividing unit 108 and processed image data output from the image processing unit 110. The image combining unit 300 outputs combined image data to the display unit 111.

The display unit 111 displays the combined image data (combined image based on combined image data) output from the image combining unit 300 on a screen.

Figure 8:
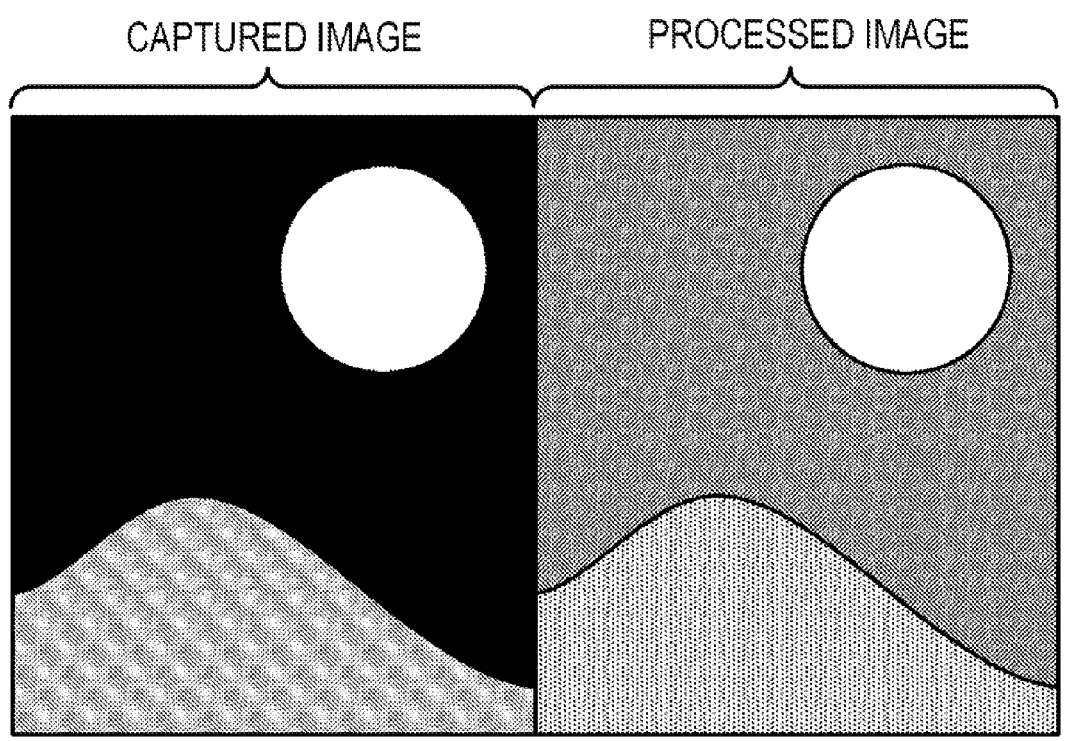
FIG. 8 is a drawing showing one example of a combined image according to Example 3.

FIG. 8 shows an example of a combined image. In the example of FIG. 8, a captured image is arranged on the left side and a processed image is arranged on the right side. It can be understood from FIG. 8 that, in the captured image, it is difficult (or impossible) to confirm the details of the dark portion since the dark portion appears to be recessed into the image. It can also be understood from FIG. 8 that, in the processed image, details of the dark portion can be easily confirmed since the dark portion appears in relief. In the present example, a combined image is displayed in which a captured image and a processed image are arranged as shown in FIG. 8.

Furthermore, there are no particular limitations on the arrangement of the captured image and processed image. For example, the captured image and the processed image may be arranged such that a portion of the captured image and a portion of the processed image overlap, or a space may be provided between the captured image and the processed image.

As has been described above, according to the present example, a combined image is displayed in which is arranged a captured image based on captured image data and a processed image based on processed image data. As a result, a user is able to easily determine what image processing has been carried out on captured image data by a user operation by visually comparing the captured image and the processed image. As a result, user-friendliness can be improved.

Furthermore, although the present example has provided an explanation of an example in which a configuration that displays a combined image was added to the configuration of Example 1, a configuration that displays a combined image may also be added to the configuration of Example 2.

EXAMPLE 4

Examples of displaying a processed image on a screen were explained in Examples 1 and 2. In addition, an example of displaying a combined image, in which is arranged a captured image and a processed image, on a screen was explained in Example 3.

Here, it is preferable to enable a user to easily determine what user operation was performed on the second operating unit 103.

A user is able to determine what user operation was performed on the second operating unit 103 by confirming the second operating unit 103. However, it is thought that a user operates the second operating unit 103 while watching a screen. Consequently, in order to determine what user operation was performed on the second operating unit 103, it is necessary for a user to change line of sight to the second operating unit 103. This changing of the line of sight leads to a decrease in user-friendliness.

Therefore, Example 4 provides an explanation of an example of displaying a combined image in which is arranged a processed image based on processed image data and an operation image that represents operation information.

As a result of displaying the aforementioned combined image, a user confirms this operation screen without having to change line of sight to the second operating unit 103, thereby making it possible to easily determine what user operation has been performed on the second operating unit 103. As a result, user-friendliness can be improved.

Furthermore, the following provides a detailed explanation of those aspects (configuration and processing) of the present example which differ from those of Example 1, while explanations of those aspects that are the same as Example 1 are omitted.

The functional configuration of the image capturing system according to the present example is the same as that of Example 3 (FIG. 7).

The data dividing unit 108 divides output data between captured image data and operation information (lower limit information). The data dividing unit 108 then outputs captured image data to the image processing unit 110 and outputs operation information to the image processing parameter determination unit 109 and the image combining unit 300.

The image combining unit 300 generates combined image data that represents a combined image in which is arranged a processed image and an operation image based on operation information output from the data dividing unit 108 and processed image data output from the image processing unit 110. More specifically, the image combining unit 300 generates operation image data that represents an operation image based on the operation information. The image combining unit 300 then generates the aforementioned combined image data based on operation image data and processed image data. The image combining unit 300 outputs the combined image data to the display unit 111.

The display unit 111 displays the combined image data (combined image representing the combined image data) output from the image combining unit 300 on a screen.

Figure 9:
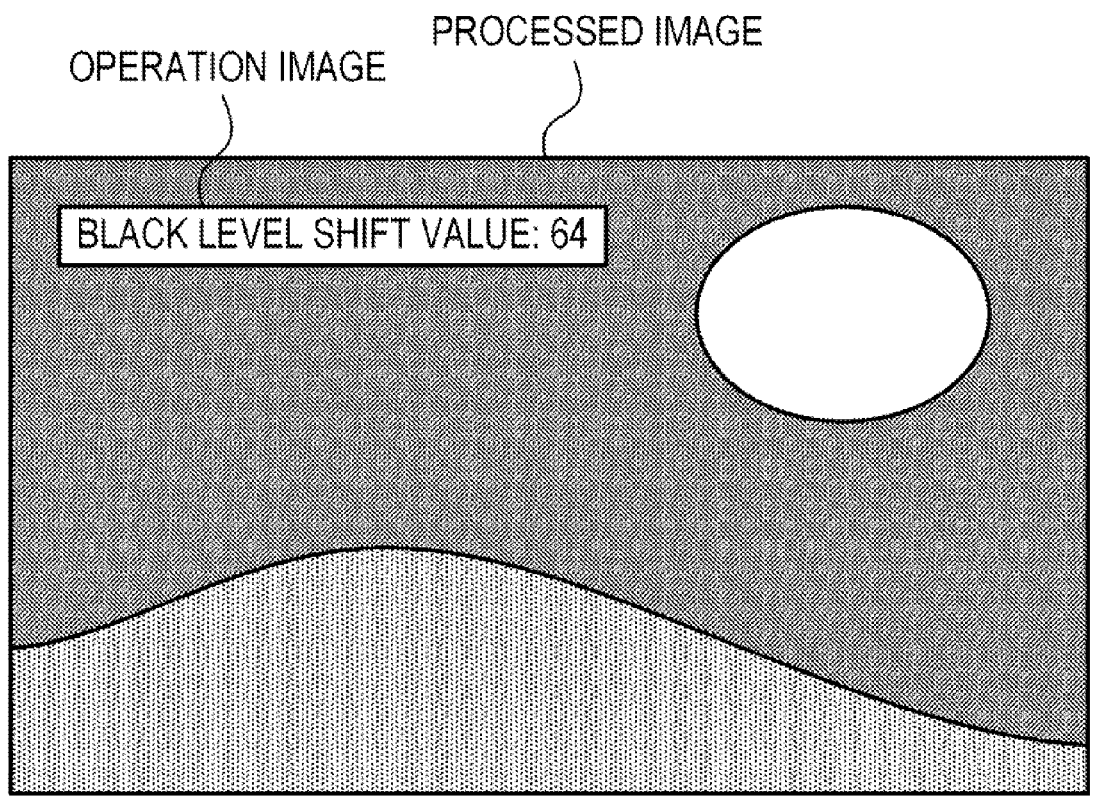
FIG. 9 is a drawing showing one example of a combined image according to Example 4.

FIG. 9 shows an example of a combined image. In the example of FIG. 9, an operation image overlaps the upper left portion of a processed image. A user is able to easily determine what user operation was performed on the second operating unit 103 by confirming this operation image. As a result, user-friendliness can be improved.

Furthermore, there are no particular limitations on the arrangement of the processed image and operation image. For example, the processed image and the operation image may be arranged so that the operation image does not overlap the processed image.

As has been described above, according to the present example, a combined image is displayed in which is arranged a processed image based on processed image data and an operation image that represents operation information. As a result, a user is able to easily determine what user operation was performed on the second operating unit 103 by confirming the operation image. As a result, user-friendliness can be improved.

Furthermore, although the present example has provided an explanation of an example in which a configuration, which displays a combined image in which is arranged a processed image and an operation image, is added to Example 1, a configuration that displays a combined image in which is arranged a processed image and an operation image may also be added to Example 2 or Example 3. More specifically, the configuration of the present example may be combined with the configuration of Example 2 to display an operation image that at least represents a desired gradation range on a screen. The configuration of the present example may also be combined with the configuration of Example 3 to display a combined image in which is arranged a captured image, a processed image and an operation image on a screen.

Furthermore, the displayed ancillary image is not limited to a captured image or operation image (image representing a user operation performed on the second operating unit 103). For example, a screen may be displayed that represents, for example, image capturing parameters that are set when image capturing captured image data or image capturing parameters that are currently set. In addition, in the case a user operation has been performed on the second operating unit 103 that is not desired, an error image may be displayed that indicates that the user operation performed on the second operating unit 103 is not desired. For example, an error image may be displayed in the case an extremely large offset value has been set by a user operation on the second operating unit 103 and a completely white image ends up being displayed for the processed image.

Furthermore, a user is thought to primarily look through a viewfinder of the image capturing apparatus. Consequently, the image display apparatus may transmit ancillary image data representing an ancillary image (an image displayed for ancillary purposes) to the image capturing apparatus. The ancillary image may then be displayed on the display unit of the image capturing apparatus (for example, a display unit used as a viewfinder).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-129050, filed on Jun. 24, 2014, which is hereby incorporated by reference herein in its entirety.

What is claimed is:

1. An image display apparatus capable of being connected to an image capturing apparatus, the image display apparatus comprising:
   a processor; and
   a memory storing a program which, when executed by the processor, causes the image display apparatus to execute:
   acquiring, from the image capturing apparatus connected to the image display apparatus, captured image data generated by the image capturing apparatus and operation information regarding a user operation related to an image processing performed on the image display apparatus;
   generating processed image data by carrying out image processing corresponding to the operation information acquired in the acquiring; and
   displaying an image based on the processed image data on a screen, wherein
   the operation information includes lower limit information representing a lower limit value of gradation values designated by a user, and
   the image processing corresponding to the operation information includes first image processing in which a gradation value of each pixel is converted so that the lower limit value of the gradation values of the processed image data coincides with the lower limit value represented by the lower limit information.

2. The image display apparatus according to claim 1, wherein
   in the image capturing apparatus, the image processing corresponding to the operation information is not performed on the captured image data.

3. The image display apparatus according to claim 1, wherein
   the first image processing is image processing in which the lower limit value represented by the lower limit information is added to the gradation value of each pixel.

4. The image display apparatus according to claim 1, wherein
   the operation information includes range information representing a gradation range of all er a portion of a dynamic range of the captured image data, and
   the image processing corresponding to the operation information includes second image processing in which a gradation value of each pixel is converted based on conversion characteristics corresponding to the gradation range represented by the range information.

5. The image display apparatus according to claim 4, wherein
   for each of a plurality of gradation ranges, characteristics information representing conversion characteristics is prepared, and
   the second image processing is image processing in which characteristics information corresponding to the gradation range represented by the range information is selected from among the plurality of characteristics information, and a gradation value of each pixel is converted based on the conversion characteristics represented by the selected characteristics information.

6. The image display apparatus according to claim 4, wherein
   the conversion characteristics corresponding to the gradation range represented by the range information are characteristics such that the number of gradation values following conversion that are assigned to the gradation range represented by the range information is larger than that of other conversion characteristics.

7. The image display apparatus according to claim 1, wherein
   in the displaying, a combined image in which a captured image based on the captured image data and a processed image based on the processed image data are arranged is displayed based on the captured image data and the processed image data.

8. The image display apparatus according to claim 1, wherein
   in the displaying, a combined image in which a processed image based on the processed image data and an operation image that represents the operation information are arranged is displayed based on the processed image data and the operation information.

9. A method for controlling an image display apparatus capable of being connected to an image capturing apparatus, the method using a processor to perform:
   acquiring, from the image capturing apparatus connected to the image display apparatus, captured image data generated by the image capturing apparatus and operation information regarding a user operation related to an image processing performed on the image display apparatus;
   generating processed image data by carrying out image processing corresponding to the operation information acquired in the acquiring; and
   displaying an image based on the processed image data on a screen, wherein
   the operation information includes lower limit information representing a lower limit value of gradation values designated by a user, and
   the image processing corresponding to the operation information includes first image processing in which a gradation value of each pixel is converted so that the lower limit value of the gradation values of the processed image data coincides with the lower limit value represented by the lower limit information.

10. The method according to claim 9, wherein
    in the image capturing apparatus, the image processing corresponding to the operation information is not performed on the captured image data.

11. The method according to claim 9, wherein
the first image processing is image processing in which the lower limit value represented by the lower limit information is added to the gradation value of each pixel.

12. The method according to claim 9, wherein
the operation information includes range information representing a gradation range of a portion of a dynamic range of the captured image data, and
the image processing corresponding to the operation information includes second image processing in which a gradation value of each pixel is converted based on conversion characteristics corresponding to the gradation range represented by the range information.

13. The method according to claim 12, wherein
for each of a plurality of gradation ranges, characteristics information representing conversion characteristics is prepared, and
the second image processing is image processing in which characteristics information corresponding to the gradation range represented by the range information is selected from among the plurality of characteristics information, and a gradation value of each pixel is converted based on the conversion characteristics represented by the selected characteristics information.

14. The method according to claim 12, wherein
the conversion characteristics corresponding to the gradation range represented by the range information are characteristics such that the number of gradation values following conversion that are assigned to the gradation range represented by the range information is larger than that of other conversion characteristics.

15. The method according to claim 9, wherein
in the displaying, a combined image in which a captured image based on the captured image data and a processed image based on the processed image data are arranged is displayed based on the captured image data and the processed image data.

16. The method according to claim 9, wherein
in the displaying, a combined image in which a processed image based on the processed image data and an operation image that represents the operation information are arranged is displayed based on the processed image data and the operation information.

17. A non-transitory computer readable medium that stores a program for implementing a method for controlling an image display apparatus capable of being connected to an image capturing apparatus, the method using a processor to perform:
acquiring from the image capturing apparatus connected to the image display apparatus, captured image data generated by the image capturing apparatus and operation information regarding a user operation related to an image processing performed on the image display apparatus;
generating processed image data by carrying out image processing corresponding to the operation information acquired in the acquiring; and
displaying an image based on the processed image data on a screen, wherein
the operation information includes lower limit information representing a lower limit value of gradation values designated by a user, and
the image processing corresponding to the operation information includes first image processing in which a gradation value of each pixel is converted so that the lower limit value of the gradation values of the processed image data coincides with the lower limit value represented by the lower limit information.

18. The image display apparatus according to claim 1, wherein
the operation information is superimposed on an ancillary region of data transferred via an SDI interface.

19. The method according to claim 9, wherein
the operation information is superimposed on an ancillary region of data transferred via an SDI interface.

* * * * *